United States Patent
Smith et al.

[11] Patent Number: 6,150,747
[45] Date of Patent: Nov. 21, 2000

[54] COMPOSITE STATOR AND ROTOR FOR AN ELECTRIC MOTOR

[75] Inventors: Mitchell D. Smith, New London; Pieter Van Dine, Mystic, both of Conn.

[73] Assignee: Electric Boat Corporation, Groton, Conn.

[21] Appl. No.: 09/304,804

[22] Filed: May 4, 1999

[51] Int. Cl.$^7$ .............. H02K 1/12; H02K 21/12; H02K 1/04; H02K 1/22

[52] U.S. Cl. .............. 310/258; 310/261; 310/267; 310/216; 310/156; 310/43; 310/271

[58] Field of Search .............. 310/258, 259, 310/254, 261, 265, 267, 268, 216, 217, 43, 156, 42, 271

[56] References Cited

U.S. PATENT DOCUMENTS

| | | | |
|---|---|---|---|
| 2,650,992 | 9/1953 | Forss et al. | 310/42 |
| 2,668,925 | 2/1954 | Bloser | 310/258 |
| 2,887,454 | 5/1959 | Toulmin, Jr. | 252/62.5 |
| 2,896,100 | 7/1959 | Axelson | 310/51 |
| 3,132,270 | 5/1964 | Phelon | 310/271 |
| 3,683,216 | 8/1972 | Post | 310/67 |
| 3,873,861 | 3/1975 | Halm | 310/43 |
| 3,919,572 | 11/1975 | Desy | 310/45 |
| 4,150,582 | 4/1979 | Brobeck | 74/572 |
| 4,433,261 | 2/1984 | Nashiki et al. | 310/156 |
| 4,492,889 | 1/1985 | Fukushi et al. | 310/89 |
| 4,661,183 | 4/1987 | Beard | 156/172 |
| 4,729,160 | 3/1988 | Brown | 29/598 |
| 4,777,397 | 10/1988 | Parshall | 310/156 |
| 4,870,310 | 9/1989 | Triplett | 310/74 |
| 4,879,485 | 11/1989 | Tassinario | 310/156 |
| 4,930,201 | 6/1990 | Brown | 29/598 |
| 4,954,736 | 9/1990 | Kawamoto et al. | 310/156 |
| 5,122,704 | 6/1992 | Blakeley et al. | 310/54 |
| 5,124,605 | 6/1992 | Bitterly et al. | 310/74 |
| 5,265,323 | 11/1993 | Odell | 29/596 |
| 5,296,773 | 3/1994 | El-Antably et al. | 310/261 |
| 5,349,257 | 9/1994 | Hernden | 310/68 B |
| 5,422,528 | 6/1995 | Prahl | 310/235 |
| 5,502,341 | 3/1996 | Sato | 310/42 |
| 5,525,852 | 6/1996 | Fanning et al. | 310/217 |
| 5,585,682 | 12/1996 | Konicek et al. | 310/89 |
| 5,717,263 | 2/1998 | Cox | 310/74 |
| 5,736,804 | 4/1998 | Potocnik et al. | 310/235 |
| 5,760,506 | 6/1998 | Ahlstrom et al. | 310/74 |
| 5,760,508 | 6/1998 | Jennings et al. | 310/74 |
| 5,806,169 | 9/1998 | Trago et al. | 29/596 |
| 5,811,900 | 9/1998 | Serdar, Jr. | 310/74 |
| 5,821,650 | 10/1998 | Gunsallus et al. | 310/74 |
| 5,828,152 | 10/1998 | Takeda et al. | 310/156 |
| 5,936,320 | 8/1999 | Takeda et al. | 310/89 |

*Primary Examiner*—Nestor Ramirez
*Assistant Examiner*—Dang Dinh Le
*Attorney, Agent, or Firm*—BakerBotts, LLP

[57] ABSTRACT

In the embodiments described in the specification, a stator for an electric motor has an outer ring member made of resin material and supported from a frame by stator caps and a flanged inner composite ring member made of resin material which receives a steel band. Laminations and coil windings are mounted inside the steel band and an outer wrap of resin material encapsulates the steel band, laminations and coil windings. A rotor arrangement includes a steel hub surrounded by a disk-shaped member made of resin material and having inner and outer rings connected by radial arms. A non-ferromagnetic steel band surrounds the peripheral surface of the disk-shaped member and laminations and magnets or coil windings are positioned on the band and are encapsulated by an outer wrap of resin material.

17 Claims, 2 Drawing Sheets

COMPOSITE STATOR AND ROTOR FOR AN ELECTRIC MOTOR

BACKGROUND OF THE INVENTION

This invention relates to stators and rotors for electric motors having reduced weight and improved corrosion resistance.

Conventional stators and rotors for electric motors are typically made from machined, cast or forged metals including steel. To provide corrosion resistance metal alloys are frequently used. In many instances it is important not only to improve the corrosion resistance but also to reduce the weight of the stators and rotors in an electric motor.

The Brown U.S. Pat. Nos. 4,729,160 and 4,930,201 disclose a rotor having a plurality of magnets bonded to a rotor hub and a composite sleeve disposed over the rotor hub and magnets. The Tassinario U.S. Pat. No. 4,879,485 discloses a permanent magnet rotor containing a stack of circular sheets of magnetic material mounted on a shaft and an array of permanent magnets adhesively bonded to the periphery of the stack of sheets, the magnets having inwardly inclined adjacent edges forming V-shaped openings. Carbon or glass fibers are wound through the V-shaped openings provided by the magnets to retain the magnets in place and a resin is applied over the threads in each opening to provide a continuous cylindrical surface. The El-Antably et al. U.S. Pat. No. 5,296,773 describes a rotor assembly consisting of a plurality of axial laminations alternately containing magnetic and non-magnetic material with an end cap at each axial end which engages stepped axial ends of the laminations, the outermost lamination on the rotor being a composite material with a carbon fiber center and a fiberglass outer layer. U.S. Pat. No. 4,433,261 to Nashiki, et al., discloses a rotor having a plurality of magnet sectors mounted on a shaft which are axially displaced with respect to each other and side plates of non-magnetic metal having recesses to receive the displaced magnet ends. The periphery of the rotor has a layer of non-magnetic fiber such as glass fiber, carbon fiber or the like, secured with a resin.

The Trago et al. U.S. Pat. No. 5,806,169 discloses an injection molded motor assembly including a stator assembled from a series of laminations having a plurality of teeth forming the stator poles and surrounded by windings which is then pressure filled with molten plastic to seal the assembly. U.S. Pat. No. 5,502,341 to Sato likewise discloses a stator assembled from laminated plates and having a resin-impregnated inner peripheral surface. In the Fukushi et al. U.S. Pat. No. 4,492,889, a stator assembly has a laminated stator core which receives stator coils and outer and inner cylinders enclosing the stator laminations and coils, along with end covers and a resin filling encapsulating the coils and laminations.

SUMMARY OF THE INVENTION

Accordingly, it is an object of the present invention to provide composite stator and rotor arrangements for electric motors which overcome disadvantages of the prior art.

Another object of the invention is to provide stator and rotor arrangements for electric motors which have reduced weight and increased corrosion resistance.

These and other objects of the invention are attained by providing a composite rotor arrangement having a metal hub and a disk made of a resin material mounted on the hub and surrounded by a thin-walled band of non-magnetic material along with a circumferential array of laminations containing magnet units on the outer surface of the non-magnetic band which is, in turn, enclosed by an outer wrap of composite material to encapsulate the array of laminations and magnet units. The magnet units may be either permanent magnets or coil windings. Suitable resin materials include but are not limited to composites made from resin with or without high strength, high modulus fibers such as fiberglass, graphite, carbon, boron, quartz and aramid fibers, i.e., aromatic polyamide fibers, which have high temperature resistance, flame resistance and electrical resistance properties.

A composite stator arrangement in accordance with the invention includes a composite outer ring retained between stator caps and surrounding a flanged inner composite ring containing a thin-walled steel band with an array of laminations and windings disposed inside the steel band and encapsulated by an outer wrap of resin material. A light-weight corrosion-resistant motor includes both the composite stator arrangement and the composite rotor arrangement of the invention.

BRIEF DESCRIPTION OF THE DRAWINGS

Further objects and advantages of the invention will be apparent from reading of the following description in conjunction with the accompanying drawings in which.

DESCRIPTION OF PREFERRED EMBODIMENTS

Figure 1:
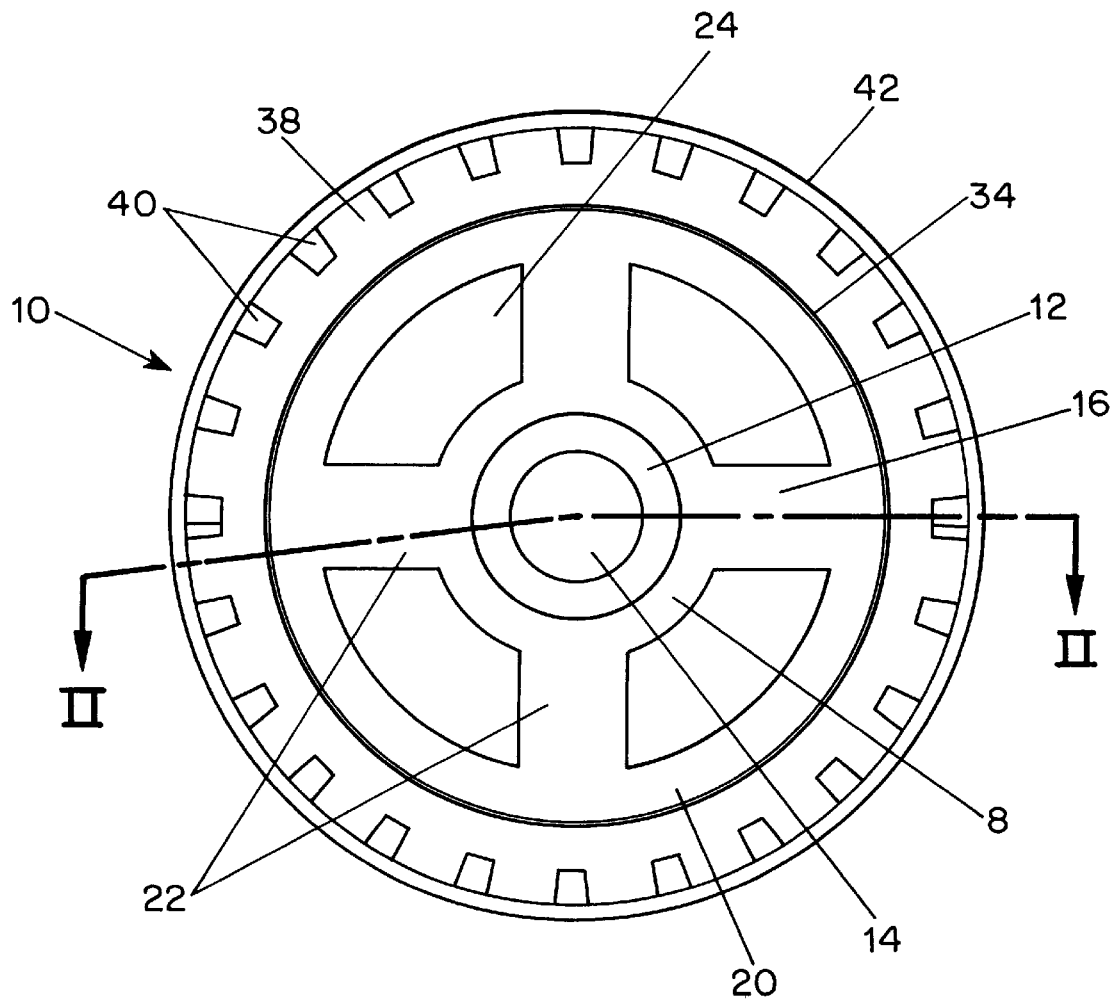
FIG. 1 is a side view of a composite rotor arrangement in accordance with the invention.
Figure 2:
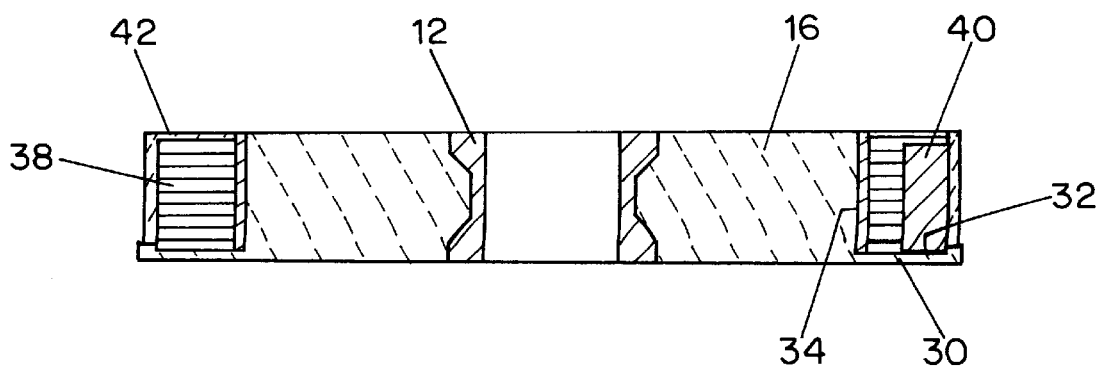
FIG. 2 is a cross sectional view of the rotor arrangement shown in FIG. 1 taken along the line II—II of FIG. 1 and looking in the direction of the arrows.

In the typical embodiment of a composite rotor arrangement 10 illustrated in FIGS. 1 and 2, a steel hub 12 having a central opening 14 to receive an axial mounting shaft carries a composite disk 16 consisting of inner and outer annular members 18 and 20, respectively, connected by four radial arms 22 which are separated by open spaces 24. As best seen in FIG. 2, the disk 16 has a projecting flange 30 extending radially outwardly from one edge of the disk providing a recessed portion 32. The periphery of the disk 16 within the recessed portion 32 is surrounded by a non-ferromagnetic steel band 34 and surrounding the non-ferromagnetic band 34 is a magnet array including a plurality of circular laminations 38 in which an array of magnet units 40 is mounted. The magnet units may be constituted either by permanent magnets or by coil windings which are energized to produce corresponding magnetic poles. An outer wrap 42 of composite material encloses the array of laminations and magnet units as well as the steel band 34.

To provide the necessary strength as well as resistance to corrosive materials and relatively low weight, the composite resin material used to make the disk 16 and the outer wrap 42 is preferably a high strength resin containing high modulus fibers such as fiberglass, graphite, carbon, boron, quartz, or aramid fiber material. The composite disk 16 may be molded in substantially final form or machined from a blank made of the resin composition.

With this composite rotor arrangement, structural integrity and rigidity of the rotor is assured while providing a light-weight structure having improved resistance to corrosion.

Figure 3:
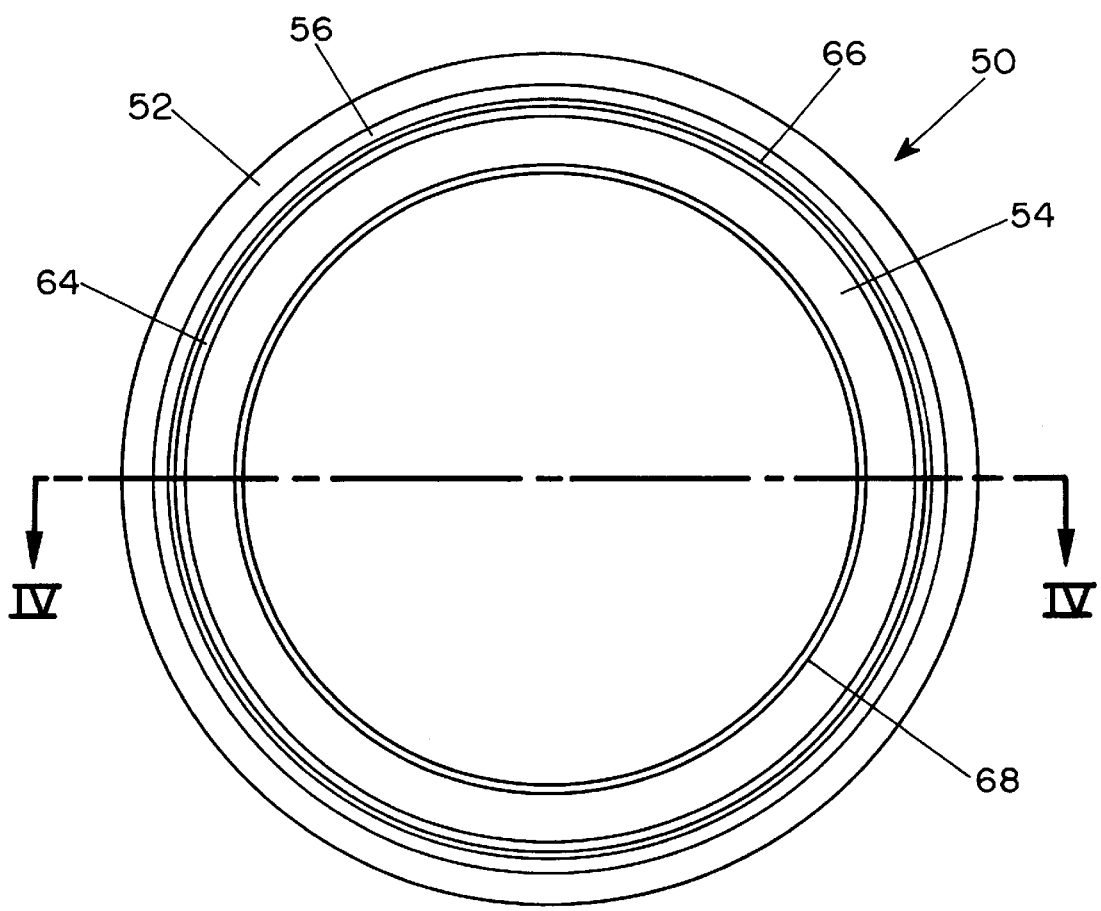
FIG. 3 is a side view of a composite stator arrangement in accordance with the invention.
Figure 4:
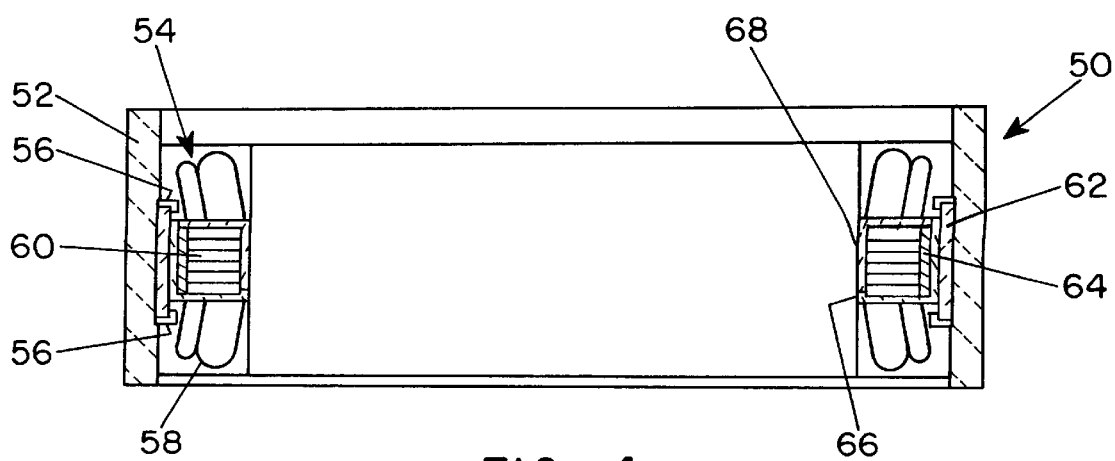
FIG. 4 is a cross sectional view of the stator arrangement of FIG. 3 taken along the line IV—IV of FIG. 3 and looking in the direction of the arrows.

FIGS. 3 and 4 illustrate a composite stator arrangement 50 in accordance with the invention which includes a motor frame 52 and a lamination and coil assembly 54 affixed to the motor frame 52 and retained therein by two stator caps 56. The lamination and coil assembly 54 includes coil windings 58 which produce the magnetic poles of the stator when energized and laminations 60, mounted in an outer composite ring 62 which is clamped between the stator caps 56 when the assembly is mounted in the motor frame 52.

In addition, a steel band 64 surrounds the laminations 60 and the coil windings 58 which are received on corresponding segments of the laminations 60. The lamination and coil assembly 54 and the steel band 64 are mounted on a flanged inner composite ring 66 and then encapsulated in an inner composite wrap 68 to provide resistance to corrosion. Thereafter the encapsulated lamination and coil assembly is affixed to the outer composite ring 62 and mounted by the stator caps 56 to the motor frame 52.

As in the composite rotor arrangement described above, the material of the composite resin components of the stator arrangement is preferably a high strength resin with or without high strength, high modulus fibers such as fiberglass, graphite, carbon, boron, quartz and aramid fibers, producing good high temperature resistance, flame resistance and electrical resistance, as well as protecting the enclosed metallic parts from corrosion.

An electric motor containing a composite stator arrangement and a composite rotor arrangement according to the invention has a reduced overall weight and provides improved corrosion resistance when operated in a corrosive environment.

Although the invention has been described herein with reference to specific embodiments, many modifications and variations therein will readily occur to those skilled in the art. Accordingly, all such variations and modifications are included within the intended scope of the claims.

We claim:

1. A composite stator arrangement for an electric motor comprising an outer ring member containing a resin material and having a cylindrical opening, a motor frame member containing resin material surrounding the outer ring member, circular stator caps disposed on opposite sides of the outer ring member for clamping the outer ring member to the motor frame member, a toroidal coil and lamination assembly comprising a plurality of coil windings mounted on core laminations distributed about the periphery of the cylindrical opening, a flanged inner ring member containing resin material in which the coil and lamination assembly is mounted, a steel band surrounding the coil and lamination assembly and an outer wrap containing resin material and encapsulating the coil and lamination assembly.

2. A composite stator arrangement according to claim 1 wherein at least one of the outer ring member, the flanged inner ring member and the outer wrap comprises a high strength resin material containing high strength, high modulus fibers.

3. A composite stator arrangement according to claim 2 wherein the high strength, high modulus fibers are selected from the group consisting of fiberglass, graphite, carbon, boron, quartz and aramid fibers.

4. A composite stator arrangement according to claim 1 wherein the steel band is in the flanged inner ring member extending around the lamination assembly and is encapsulated by the outer wrap.

5. A composite rotor arrangement comprising a central hub member having an axial passage for receipt of a rotor shaft, a disk-shaped member containing resin material mounted on the central hub member having an outer peripheral surface, an array of laminations containing magnet units mounted on the outer peripheral surface of the disk-shaped member, a non-ferromagnetic steel band on an outer peripheral surface of the disc-shaped member beneath the array of laminations and an outer wrap containing resin material and encapsulating the array of laminations and magnet units.

6. A composite rotor arrangement according to claim 5 wherein at least one of the disk-shaped member and the outer wrap comprises a high strength resin material containing high strength, high modulus fibers.

7. A composite rotor arrangement according to claim 6 wherein the high strength, high modulus fibers are selected from the group consisting of fiberglass, graphite, carbon, boron, quartz and aramid fibers.

8. A composite rotor arrangement according to claim 5 wherein the disk-shaped member has a peripheral flange extending radially outwardly and the array of laminations is mounted in a recess formed by an outer peripheral surface of the disk and the peripheral flange.

9. A composite rotor arrangement according to claim 5, wherein the disk-shaped member includes inner and outer rings joined by radial arms which are separated by open spaces.

10. A composite rotor arrangement according to claim 5, wherein the magnet units comprise permanent magnets.

11. A composite rotor arrangement according to claim 5, wherein the magnet units comprise coil windings. ring member containing resin material in which the toroidal coil and the lamination assembly is mounted and an outer stator wrap enclosing the coil and the lamination assembly, and a composite rotor arrangement rotatably supported within the opening of the composite stator arrangement comprising a hub, a disk-shaped member mounted on the hub containing a resin material, a lamination assembly containing magnet units mounted on the periphery of the disk-shaped member, and an outer rotor wrap containing resin material and encapsulating the lamination assembly containing magnetic units.

12. An electric motor comprising a stator arrangement including an outer ring member containing resin material and having a cylindrical opening, a toroidal coil and lamination assembly mounted within the cylindrical opening, a flanged inner ring member containing resin material in which the toroidal coil and the lamination assembly is mounted and an outer stator wrap enclosing the coil and the lamination assembly, and a composite rotor arrangement rotatably supported within the opening of the composite stator arrangement comprising a hub, a disk-shaped member mounted on the hub containing a resin material, a lamination assembly containing magnet units mounted on the periphery of the disk-shaped member, a non-ferromagnetic steel band on the outer peripheral surface of the disc-shaped member beneath the lamination assembly and an outer rotor wrap containing resin material and encapsulating the lamination assembly containing magnetic units.

13. An electric motor according to claim 12 wherein the toroidal coil and lamination assembly is affixed to the outer ring member by circular stator caps.

14. An electric motor according to claim 12 wherein at least one of the outer ring member, the flanged inner ring member, the outer stator wrap, the disk-shaped member and the outer rotor wrap comprises a high strength resin material containing high strength, high modulus fibers.

15. An electric motor according to claim 14 wherein the high strength, high modulus fibers are selected from the group consisting of fiberglass, graphite, carbon, boron, quartz and aramid fibers.

16. An electric motor according to claim 12 including a steel band in the flanged inner ring member extending around the lamination assembly and encapsulated by the outer wrap.

17. An electric motor according to claim 12 wherein the disk-shaped member includes inner and outer rings joined by radial arms which are separated by open spaces.

* * * * *

UNITED STATES PATENT AND TRADEMARK OFFICE
CERTIFICATE OF CORRECTION

PATENT NO.   : 6,150,747
DATED        : November 21, 2000
INVENTOR(S)  : Smith et al.

Page 1 of 1

It is certified that error appears in the above-identified patent and that said Letters Patent is hereby corrected as shown below:

Column 4,
Line 27, "ring" should be deleted
Lines 28-38, should be deleted in their entirety Column 2,
Line 26, "cross sectional" should read -- cross-sectional --
Line 32, "cross sectional" should read -- cross-sectional --

Column 5,
Line 6, "energized and" should read -- energized, and --; and "60," should read -- 60 --

Signed and Sealed this

Twenty-fifth Day of December, 2001

Attest:

Attesting Officer

JAMES E. ROGAN
Director of the United States Patent and Trademark Office